US009764513B2

(12) United States Patent
Stampfl et al.

(10) Patent No.: US 9,764,513 B2
(45) Date of Patent: Sep. 19, 2017

(54) METHOD FOR THE CONSTRUCTION OF A SHAPED BODY

(71) Applicant: Ivoclar Vivadent AG, Schaan (LI)

(72) Inventors: Jürgen Stampfl, Wien (AT); Johannes Homa, Wien (AT); Johannes Patzer, Wien (AT); Gerald Mitteramskogler, Wien (AT); Jörg Ebert, Buchs (CH); Jürgen Laubersheimer, Buchs (CH); Wolfgang Wachter, Schaan (LI)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 165 days.

(21) Appl. No.: 14/424,133

(22) PCT Filed: Aug. 21, 2013

(86) PCT No.: PCT/EP2013/067375
§ 371 (c)(1),
(2) Date: Feb. 26, 2015

(87) PCT Pub. No.: WO2014/033027
PCT Pub. Date: Mar. 6, 2014

(65) Prior Publication Data
US 2015/0258732 A1    Sep. 17, 2015

(30) Foreign Application Priority Data
Aug. 28, 2012 (EP) .................................. 12182047

(51) Int. Cl.
G06F 17/00       (2006.01)
B29C 67/00       (2017.01)
B33Y 10/00       (2015.01)
B33Y 50/02       (2015.01)
B29L 9/00        (2006.01)

(52) U.S. Cl.
CPC ........ *B29C 67/0051* (2013.01); *B29C 67/007* (2013.01); *B29C 67/0066* (2013.01); *B29C 67/0088* (2013.01); *B33Y 10/00* (2014.12); *B33Y 50/02* (2014.12); *B29L 2009/00* (2013.01)

(58) Field of Classification Search
CPC .............. A61C 13/0013; B22F 3/1055; B22F 2003/1056; B22F 2003/1057;
(Continued)

(56) References Cited

U.S. PATENT DOCUMENTS 5,096,530 A * 3/1992 Cohen ................ B29C 67/0092
264/401 X
2009/0184444 A1    7/2009 Honda et al.
2014/0044824 A1    2/2014 Rohner et al.

FOREIGN PATENT DOCUMENTS

EP    1894704 A1    3/2008
EP    2186625 A2    5/2010
(Continued)

OTHER PUBLICATIONS

International Preliminary Report on Patentability of PCT/EP2013/067375, Mar. 3, 2015, 8 pages.

*Primary Examiner* — Leo B Tentoni
(74) *Attorney, Agent, or Firm* — Ann M. Knab; Thad McMurray

(57) ABSTRACT

The invention relates to a method for the construction of a shaped body from photopolymerizable material by using lithography-based generative production, in which a layer of liquid photopolymerizable material is defined on a production platform, and is polymerized in an exposure region having a predetermined contour, a further layer of photopolymerizable material is defined, the layer defined last is polymerized in an exposure region having a predetermined contour for the layer defined last, and the latter two steps are
(Continued)

Figure 1:
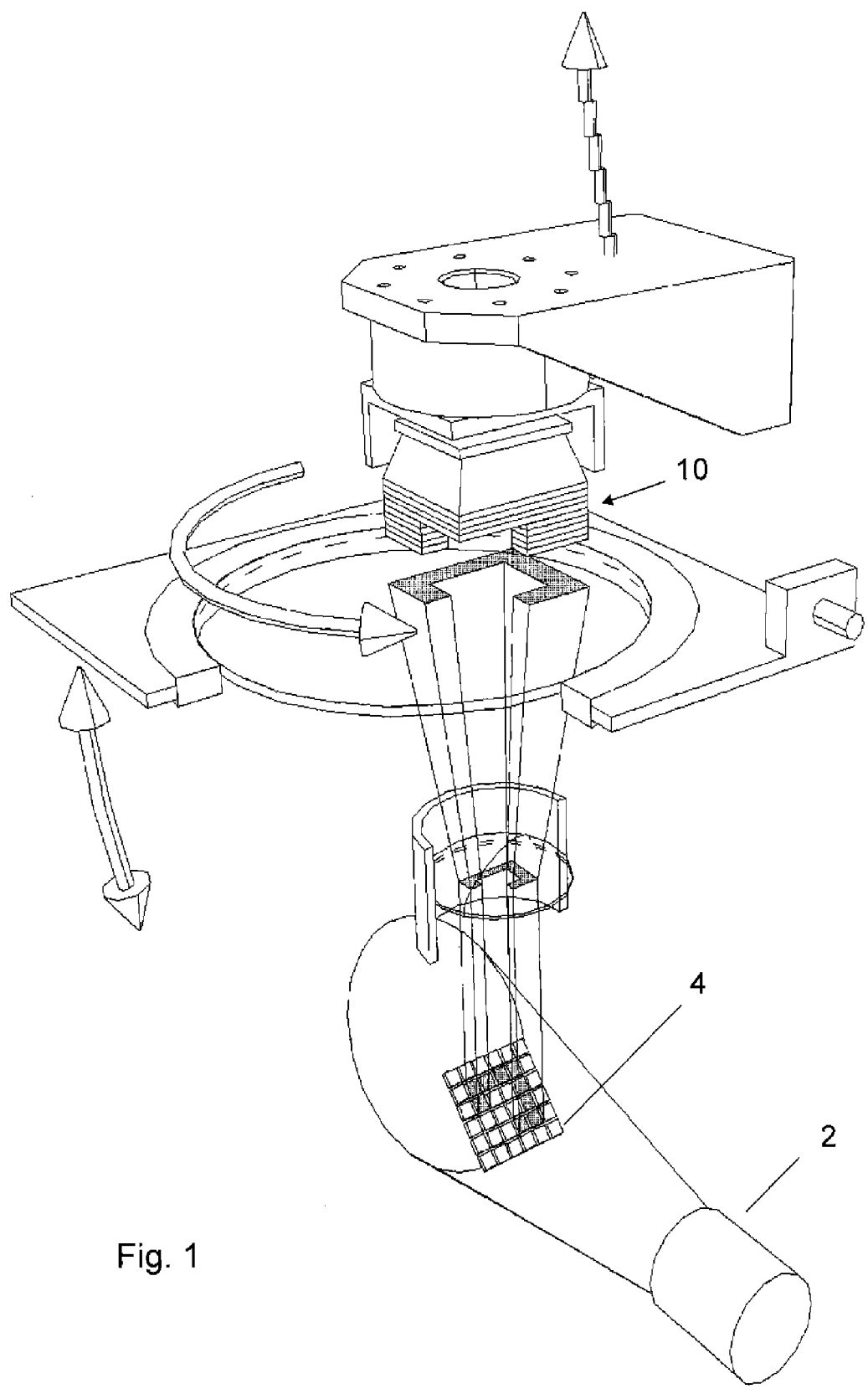

repeated until a shaped body having a predetermined shape has been formed by the sequence of cured layers with contours predetermined layer by layer, each exposure in an exposure region having a predetermined contour being carried out by controlled activation of individual exposure elements in a two-dimensional array of exposure elements, each exposure element being assigned an image element, wherein the exposure of the exposure region is carried out by a common light source and by a two-dimensional light intensity modulator which is illuminated by the light source and which has a grid of individually controllable intensity modulators, in such a way that each illuminated intensity modulator forms and exposure element that exposes an image element in the exposure region, wherein a two-dimensional matrix is compiled for each exposure step of a layer, each element of the matrix being assigned to an exposure element in the array of exposure elements and control instructions for this exposure element being obtained in the form of a time-dependent function which individually establishes the intensity profile of the radiation of the exposure element over the exposure step, characterized in that, if a component of the intensity variation common to all time-dependent function of the intensity profiles of all exposure elements to be activated exists as a general intensity variation in an exposure step, this general intensity variation is carried out by controlling the intensity of the light source in accordance with the general intensity variation.

12 Claims, 6 Drawing Sheets

(58) Field of Classification Search
CPC ..... B22F 2003/1058; B22F 2003/1059; B29C 67/0051; B29C 67/0062; B29C 67/0066; B29C 67/007; B29C 67/0085; B29C 67/0088; B29C 67/0092; B29C 67/0096; B33Y 10/00; B33Y 30/00; B33Y 40/00; B33Y 50/00; B33Y 50/02; G06F 17/00
USPC ........................ 264/401; 425/174.4; 700/120
See application file for complete search history.

(56) References Cited

FOREIGN PATENT DOCUMENTS

| WO | 0227408 A2 | 4/2002 |
|---|---|---|
| WO | 2008088642 A2 | 7/2008 |
| WO | 2012009630 A1 | 1/2012 |

* cited by examiner

METHOD FOR THE CONSTRUCTION OF A SHAPED BODY

CROSS-REFERENCE TO RELATED APPLICATIONS

This application is a National Stage application of International patent application PCT/EP2013/067375 filed on Aug. 21, 2013, which claims priority to European patent application No. 12182047.6 filed on Aug. 28, 2012, the disclosures of which are incorporated herein by reference in their entirety.

The invention relates to a method for the construction of a shaped body from liquid photopolymerizable material by using lithography-based generative production (rapid prototyping), in which a layer of viscous liquid material is defined on a production platform, the layer is polymerized by exposure in an exposure region having a predetermined contour by an exposure unit, a further layer of photopolymerizable material is defined on the polymerized layer, the layer defined last is polymerized by exposure in an exposure step in an exposure region having a predetermined contour for the layer defined last, and the latter two steps are repeated until a shaped body having a predetermined shape has been formed by the sequence of cured layers with contours predetermined layer by layer, each exposure in an exposure region having a predetermined contour being carried out by controlled activation of individual exposure elements in a two-dimensional array of exposure elements, each exposure element being assigned an image element and the exposed image elements together defining the exposure region, wherein a two-dimensional matrix is compiled for each exposure step of a layer, each element of the matrix being assigned to an exposure element in the array of exposure elements and control instructions for this exposure element being obtained in the form of a time-dependent function which individually establishes the intensity profile of the radiation of the exposure element over the exposure step.

A method for constructing a shaped body is known, for example, from WO 2010/045950 A1, which relates in particular to the construction of dental restorations from liquid photopolymerizable materials. In the known method, a construction platform is held vertically movably above a tank bottom, which is formed so as to transmit light. Below the tank bottom, there is an exposure unit. The production platform is first lowered into the photopolymerizable material until only a layer of photopolymerizable material with the desired layer thickness remains between the production platform and the tank bottom. This layer is subsequently exposed with a predetermined contour by the exposure unit, and thereby cured. After the production platform has been raised, photopolymerizable material is replenished from the surroundings and the production platform is lowered again, the lowering being controlled in such a way that a layer with the desired thickness is defined between the layer formed last and the tank bottom. The latter two steps are then repeated until a shaped body having the desired shape has been produced by the successive curing of layers each with a predetermined contour.

The exposure in an exposure region having a predetermined contour is carried out using an exposure unit having an array of exposure elements, which can be driven selectively in order to produce an exposure region having a predetermined contour. The exposure unit may for example comprise a light source and an array of micromirrors, which can selectively be switched on and off, i.e. reflect or not reflect light into an associated image element in the exposure region. Adjustment of the (average) intensity of an exposure element can be carried out by successively switching on a micromirror with the desired frequency and desired exposure pulse duration, so that a desired intensity is obtained throughout the entire exposure step. Other exposure units may comprise a light source and a position-selective light modulator (digital light valve), for example in the form of an LCD array, which forms such an array of exposure elements having individually adjustable intensities.

European Patent Application EP 1 894 704 A1 also addresses the problem of improved resolution of the shaped bodies at the edges of the shaped bodies to be constructed. To this end, inter alia, gray scaling of the image elements lying at the edge is proposed, the procedure corresponding to the anti-aliasing method known from computer graphics. In order to carry out the exposure with gray scales at the edge, for example, the exposure intensity of the exposure elements is set to be lower with a constant exposure duration, the exposure intensity being constant over the exposure duration; as an alternative, with an identical intensity for all image elements, the exposure duration is shortened in a controlled way for image elements at the edge, in order to carry out gray scale adjustment for better definition of the shaped body edges. Correspondingly, it is also mentioned in WO 2008/088642 A2, in a similar context for the exposure of edge image elements, that the exposure time for edge image elements may also be adjusted in order to achieve gray scaling.

The shaped body to be produced by the method according to the invention may for example be a green body for a dental restoration, in which case the photopolymerizable material may be a ceramic-filled photopolymer (slip).

After construction of the green body by layered polymerization with the desired contour, a heat treatment of the shaped body is carried out. The first step of the heat treatment comprises removal of the photopolymerized binder material, so-called debindering. As soon as the binder matrix has been removed by thermal decomposition, the shaped body consists of loosely packed ceramic powder particles which are held together by cohesive forces. Defects may be created during the debindering, i.e. cracks may be formed in the shaped body. Such defects may be the result of a nonoptimized temperature profile during the debindering, although their origin may also lie in the production of the shaped body by layered polymerization. The structural strength of the shaped part during the debindering is very limited. In the debindering, the relaxation of internal stresses, which have been built up during the production of the shaped body by layered polymerization, may lead to cracks in the weakened structure during the debindering. Internal stresses may also build up during the photopolymerization of the photopolymerizable slip. It has been found that volume shrinkage of about 5% occurs during the photopolymerization. Viscous influx of slips can compensate for this volume shrinkage. However, when already solidified surfaces hinder the material flow, internal stresses build up in the resulting solidifying layer. In the conventional method, the tank bottom and the solid surface of the layer cured last form solid boundary surfaces which limit the material influx. Furthermore, solidifying zones of the layer limit the influx of further photopolymerizable material during the polymerization.

Known devices for the construction of shaped bodies by layered polymerization use exposure protocols having constant parameters of exposure duration and exposure intensity, the product of which gives the energy dose. It is known that a minimal energy dose is required in order to induce photopolymerization. Since no dependency of the geometrical accuracy (position resolution) or the generation of internal stresses and cracks on the exposure duration and exposure intensity was known, exposures with high intensities were favored with a view to a short exposure duration.

Internal stresses due to polymerization shrinkage are known from the field of photocurable dental composite materials. Residual internal stresses compromise the mechanical and chemical stability of the dental restorations produced therefrom. It has been found that various types of curing can lead to significantly lower polymerization stresses (see Nicoleta et al., "Is the soft-start polymerization concept still relevant", Clinical Oral Investigations, 1(15), pages 21-29). Reduction of the internal stresses is achieved by minimizing the volume shrinkage, which is based on a lower degree of conversion. In this context, illumination protocols for dental composite materials which operate with nonconstant intensities are also known. One example of this is the so-called "soft-start" protocol, which involves initial exposure with reduced intensity for a determined time period followed by exposure with maximum intensity. A further protocol is so-called "pulse-delay" curing, in which exposure with a pulse of reduced intensity, a subsequent waiting time without exposure (seconds or even minutes) and then exposure with maximum intensity follow one another.

A method comprising the features of the preamble of claim 1 is known from WO 2012/009630 A1.

It is an object of the present invention to provide a method for the layered construction of a shaped body from photopolymerizable material, with which it is possible to be able to reduce defects in the finished shaped body, such as internal stresses, cracks and geometrical inaccuracies at the edges.

This object is achieved by the inventive method having the features of the patent claims. Advantageous embodiments of the invention are described in the dependent claims.

In connection with the method, a two-dimensional matrix is compiled for each exposure step of a layer, each element of the matrix being assigned to an exposure element in the array of exposure elements and control instructions for this exposure element being obtained in the form of a time-dependent function which individually establishes the intensity profile of the radiation of the exposure element over the exposure step. In this connection, by controlled adjustment of the intensity, it is possible to influence the polymerization kinetics differentially with respect to position and/or time so as to expediently reduce defects in the polymerized layer. The time-dependent functions for defining the intensity profile may be continuous uninterrupted functions or functions in the form of pulse sequences, in which the intensity is controlled by varying the pulse duration and/or pulse frequency.

The method according to the invention is arranged such that, as far as in an exposure step all time-dependent functions of the intensity curves of the exposure elements to be activated contain a common variation component as a general intensity variation, this general intensity variation is accomplished by controlling the intensity of the light source in a accordance with the general intensity variation. In this manner it is preferably possible to adjust the intensity of the light source to a minimum in such a manner that the image element which has to be exposed with the highest intensity only just receives the desired exposure intensity. If the exposure intensity decreases during the exposure step, the intensity of the light source is reduced accordingly. In this manner it is possible to operate the light source at each point in time only with the minimally required intensity; as a result the so called dark field is reduced. The dark field is composed of areas with image elements which during an exposure step are not to be exposed at all. In principle, the light intensity in this dark field should be zero. Due to the not completely ideal characteristics of the light modulators and the beam guidance it occurs that during an exposure step there is a non-vanishing light intensity also in the dark field outside of the exposure area. This residual light intensity in the dark field depends on the intensity of the light source used for the exposure, wherein the residual light intensity of the dark field increases with increasing intensity of the light source. By minimizing the controlled intensity of the light source in dependence on time over the exposure steps the undesirable intensity of the dark field can be minimized in this manner. This dark field is effective during the entire construction process, and is permanently present also in areas which currently are not to be exposed. As a result the photopolymerizable material continuously reacts at a low level, and it comes to an increasing gel formation and an increasing viscosity of the liquid base material.

With the present invention a method is proposed which, by varying the light source intensity in dependence on time such that the light intensity is, at each point in time, set to the minimally possible value, allows to reduce the total dose of light energy which affects the photopolymer through the dark field. As far as in an exposure step the currently to be activated image elements have a common variation component of a time-dependent intensity profile, this common component of the intensity variation is not accomplished by individually controlling the individual exposure elements accordingly, but by globally controlling the intensity of the light source accordingly. In any case the way of proceeding of the present invention results in a reduction of the integrated intensity of the light source, and thereby in a reduction of the effects of the dark field, since, if the intensity of the light source would not be varied, this light source would have to be operated at the maximum value which may be required during the exposures of the construction process.

In a preferred embodiment, during an exposure step, one or more continuous areas to be exposed in the exposure region provided for this exposure step, and the exposure elements assigned to them, which are to be activated, are identified. Each continuous area is composed of a core region and an edge region, the time-dependent functions of the intensity profiles of the exposure elements being selected in such a way that they are started earlier in the core region than the exposure elements in the edge region.

In an alternative embodiment, during an exposure step, one or more continuous areas to be exposed in the exposure region provided for this exposure step, and the exposure elements assigned to them, which are to be activated, are identified. Each continuous area is composed of a core region, one or more central regions with an increasing distance from the core region, and an edge region. The time-dependent functions of the intensity profiles of the exposure elements are selected in such a way that they are started first in the core region, then are started in the central zone or zones successively in the order of their distance from the core region, and finally the exposure elements in the edge region are started.

The effect achieved with the procedures defined above is that the polymerization progresses in continuous areas from the inside outward. In this way, since the progressive polymerization in the inner zone has already led to shrinkage in the area to be exposed therein, photopolymerizable material from zones lying further out can flow in. In this way, the stresses otherwise occurring owing to shrinkage during the polymerization can be reduced in the polymerized material.

In this case, in preferred embodiments, the time-dependent functions of the intensity profiles of the exposure elements are selected in such a way that the exposure elements of a central region or of the edge region are started only when the exposure elements of the preceding region lying further inward have delivered at least 50% of their integrated intensity for the current exposure step. In particular, it is preferable for the time-dependent functions of the intensity profiles of the exposure elements to be selected in such a way that the exposure elements of a central region or of the edge region are started only when the exposure elements of the preceding region lying further inward have fully delivered their integrated intensity for the current exposure step.

In a preferred method, the time-dependent functions of the intensity profiles of the exposure elements are defined by pulse sequences having predetermined pulse lengths and periods, and in pulse sequences for exposure elements for an edge region the pulse lengths are selected to be shorter than those for exposure elements for regions lying further inward. This is because, in the context of the present invention, it has been found that a better position resolution is achieved by exposure with pulse sequences having shorter pulse lengths. In this regard, it is advantageous to use pulse sequences having shorter pulse lengths in the edge region where good position resolution is sought for accurate contour definition of the edge, while operation can be carried out with longer pulse lengths in the core region or in one or more central regions, which reduces the exposure duration.

In another preferred method, the time-dependent functions of the intensity profiles of the exposure elements are defined by pulse sequences having predetermined pulse lengths and periods. Furthermore, the periods for the pulse sequences for exposure elements in the edge region are selected to be longer than those for exposure elements for regions lying further inward. This is because, in the context of the present invention, it has also been found that in the case of exposure with pulse sequences of given pulse lengths, a higher position resolution can be achieved with longer periods (lower frequencies) of the pulse sequences, i.e. light is scattered less strongly from the exposure region into zones outside the exposure region, which implies a better contour definition of the exposure region. For this reason, pulse sequences having longer periods are used in the edge region, where the better contour definition is needed, than in regions lying further inward, where operation may also be carried out with shorter periods (higher frequencies) in order to reduce the exposure duration.

In another preferred method, the time-dependent functions of the intensity profiles of the exposure elements are selected in such a way that, during an exposure step, they have a first exposure phase with a low exposure intensity and subsequently a phase having a high intensity at a maximum value for a predetermined period, the time-dependent functions being established in such a way that the first exposure phase with a lower intensity is at least three times as long as the predetermined period at the maximum value. In particular, the time-dependent functions of the intensity profiles in the first exposure phase may be defined by functions of the form $I_0 \cdot e^{t/\tau}$, where $I_0$ is a constant and $\tau$ is a predetermined time constant. If all image elements currently to be exposed have the same time constant $\tau$, the light source may be operated with an intensity proportional to $e^{t/\tau}$.

In a preferred embodiment, when two or more areas lying next to one another but separated by intermediate spaces are to be exposed in the exposure region, the exposure elements of directly neighboring areas are controlled as a function of time in such a way that the exposure of directly neighboring areas takes place with a time offset with respect to one another. In this way, the position resolution and edge definition of the areas can be improved for the following reason: by scattering, light also enters into the intermediate spaces of neighboring areas. If both areas are exposed simultaneously, the scattered light from the two areas is added together in the intermediate space and the intensity may exceed the threshold for polymerization. This can lead to unintended polymerization in the intermediate space. If the neighboring areas are exposed in succession, scattered light from only one of the neighboring areas enters into the intermediate space in each case. Although the duration of the entry of scattered light into the intermediate space is thereby increased, its intensity is halved and can therefore remain below the threshold intensity for polymerization, so that no polymerization takes place in the intermediate space.

Optionally, when a plurality of areas of different size, which lie next to one another but are fully separated, are to be exposed in the exposure region, the areas may be exposed with different intensity profiles as a function of their size.

Figure 2:
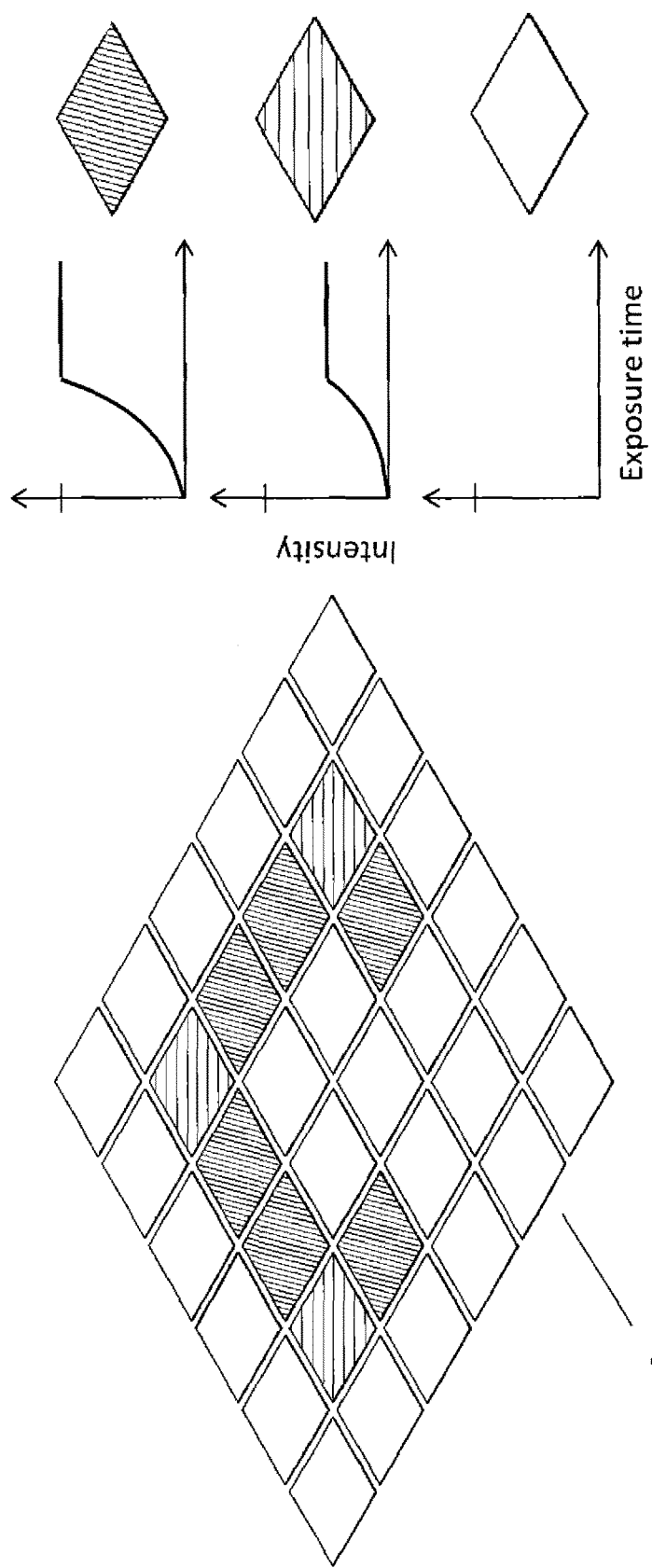
Figure 3:
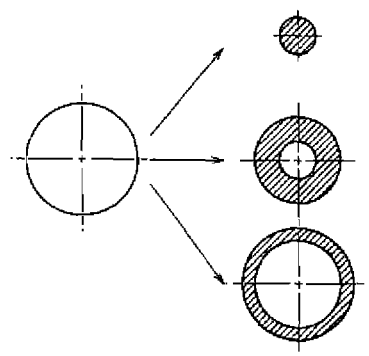
Figure 4:
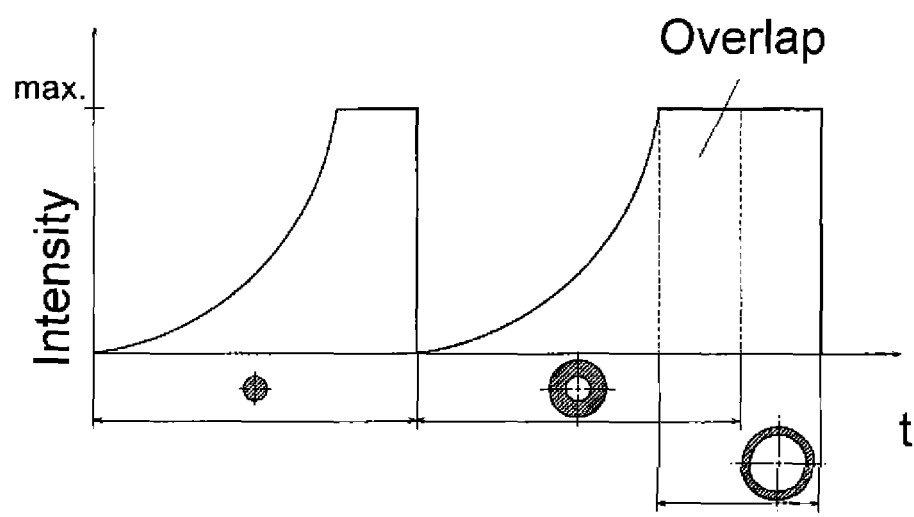
Figure 5:
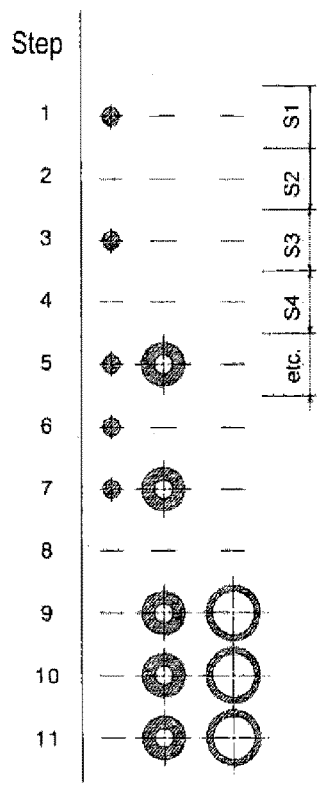
Figure 6:
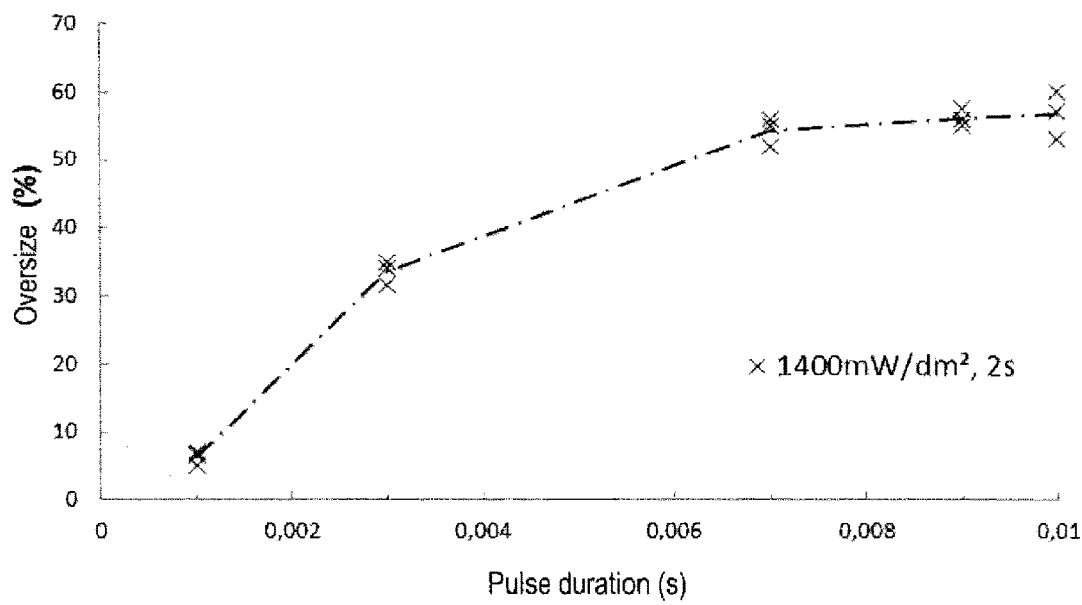
Figure 7:
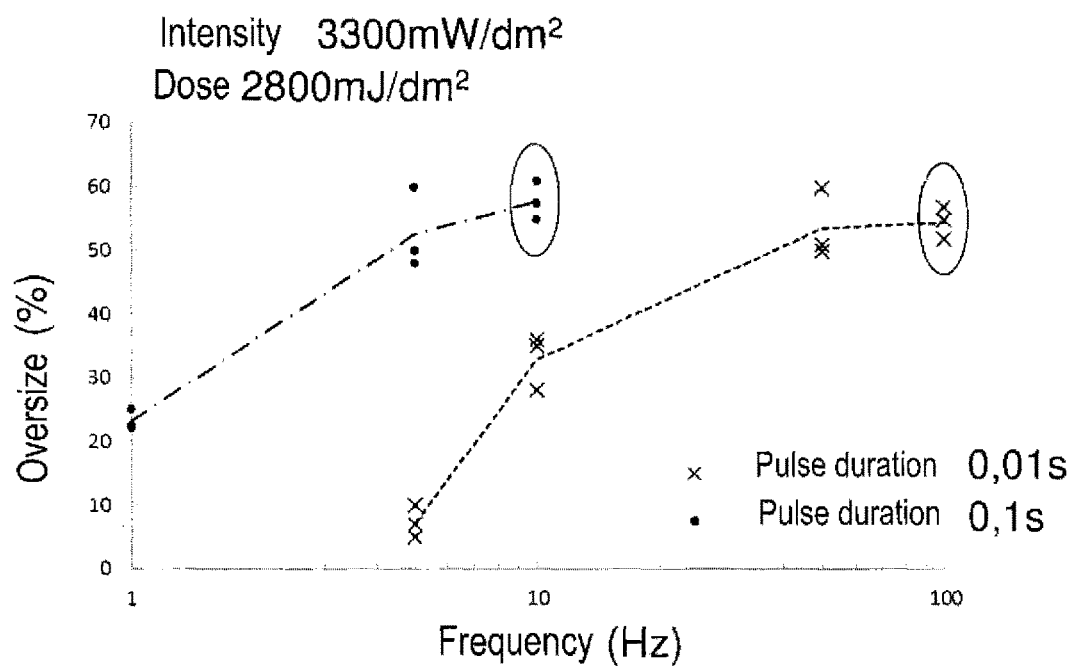
Figure 8:
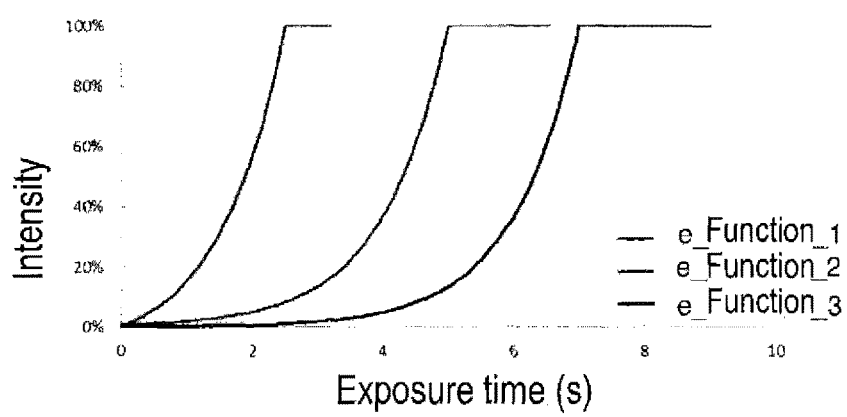
Figure 9:
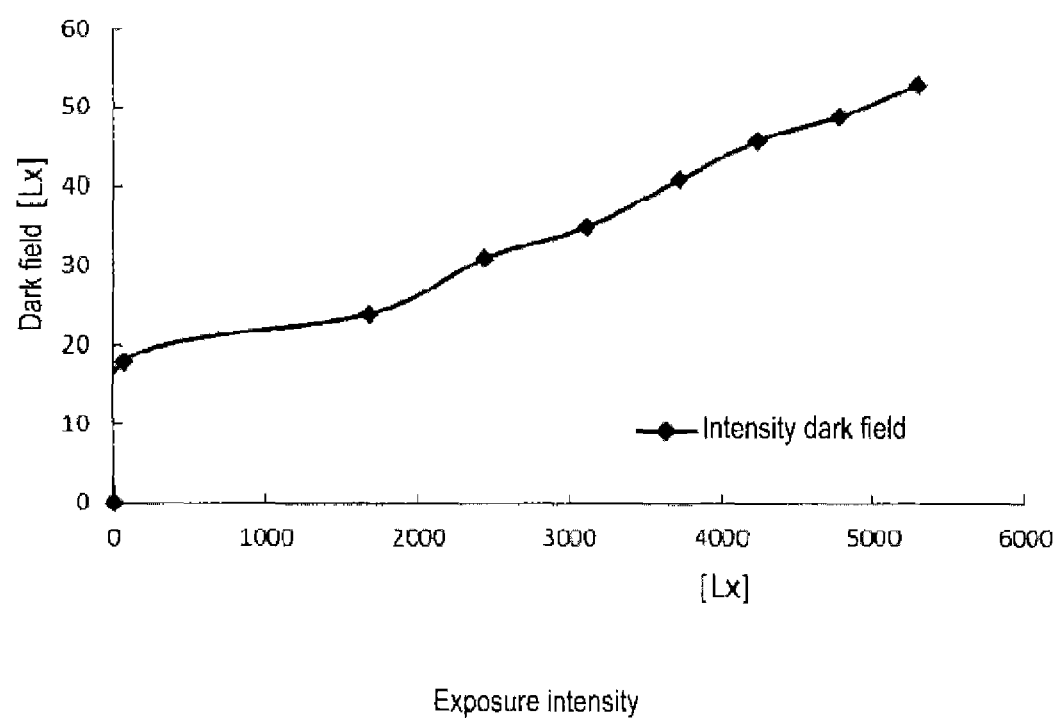

The invention will be explained below with the aid of exemplary embodiments in conjunction with the drawings, in which:

FIG. 1 shows a schematic representation of parts of a device for the construction of a shaped body by a method according to the present invention, FIG. 2 shows a detail of a two-dimensional light intensity modulator having some exposure elements activated, it being schematically indicated that two types of activated exposure elements are operated with different intensity profiles, FIG. 3 shows a schematic representation of an exposure region and its division into a core region, a central region and an edge region, FIG. 4 shows the time profile of the intensities of the exposure elements from the core region, the central region and the edge region of FIG. 1, FIG. 5 shows a schematic representation of the time sequence of successive exposure phases, in which the core region, the central region and the edge region are exposed with a different time sequence, FIG. 6 shows a measure of the position resolution (oversize in %) as a function of the pulse duration for two intensities (0.14 mW/mm$^2$ and 0.3 mW/mm$^2$), FIG. 7 shows a measure of the position resolution (oversize in %) as a function of the pulse frequency for two fixed pulse lengths (0.01 s and 0.1 s), FIG. 8 shows three different time profiles of the exposure intensity with a slow rise to a maximum value, and FIG. 9 shows the light intensity of the dark field as a function of the intensity of the light source.

FIG. 1 shows parts of a device for the construction of a shaped body, which may be used in order to carry out a method according to the present invention. In connection with the tests for the present invention, an exposure unit having a light source 2 (wavelength 460 nm), a two-dimensional light intensity modulator 4 in the form of a DLP (Digital Light Processing) chip, which is illuminated by the light source, and a programmable control unit (not shown) were used. The key component of the processing unit is the DLP chip. It consists of micromirror actuators, i.e. tiltable reflecting surfaces, arranged in the form of a grid, only 6×6 micromirrors being indicated in FIG. 1 for reasons of representability. The movement of the micromirrors is induced by electrostatic fields. The micromirrors illuminated by the light source here constitute the exposure elements. Each exposure element is assigned an image element (pixel) in the exposure region. Each micromirror can be adjusted individually in terms of its angle, and generally has two stable end states, namely an active position in which it reflects light from the light source into the image element assigned to the exposure element in the exposure region, and a deactivated position in which no light is reflected into the exposure region by the micromirror, which is tilted away. In FIG. 1, the deactivated micromirrors are represented in white and the activated micromirrors are represented as dotted. The micromirrors can be switched to and fro between these positions, typically with frequencies of up to 5 kHz, under the control of the control unit. In micromirror arrangements, the intensity in each image element can be controlled by driving the micromirror with a pulse sequence, the pulse sequence being subjected to pulse-width modulation in order to adjust the intensity; the maximum intensity is achieved when the micromirror is placed continuously in the active position throughout the entire exposure step. In principle, however, it is also possible to use exposure units other than micromirror arrangements, which for example use so-called "digital light valves".

With the device schematically represented in parts in FIG. 1, a shaped body 10 is constructed by successive exposure of layers having a predetermined contour on a production platform, which is suspended from a carrier adjustable in the height direction. By lowering the production platform into a tank having a transparent bottom, a layer of as yet uncured photopolymerizable material, which is contained in the tank, is defined between the lowermost layer formed last on the shaped body 10 and the tank bottom. By adjusting the distance between the lower side of the layer formed last on the shaped body 10 and the tank bottom, the desired layer thickness can be defined. The layer defined in this way is then cured with the desired contour by exposure from below. In the situation schematically indicated in FIG. 1, the intention is to expose an area which has the shape of the edge of a square, one corner of the square being cut off. This exposure region is exposed by the controlled activation of individual exposure elements in the light intensity modulator 4. FIG. 2 in turn schematically shows the detail of 6×6 exposure elements of the light intensity modulator. Here, the exposure elements activated in the current exposure step are represented by shading. Two types of shading are shown, the differently shaded exposure elements carrying out exposures with different intensity profiles as indicated on the right in FIG. 2. When the light intensity modulator is formed by a micromirror arrangement, the intensity profile is achieved by a pulse sequence of activations of the micromirrors, the pulse sequences being pulse-width modulated in order to achieve the desired average intensity profile. The maximum exposure intensity of an exposure element is achieved when the micromirror is activated over the entire exposure time of the exposure step. Besides this, an exposure intensity variation common to all the exposure elements can be achieved by varying the light intensity of the light source 2.

According to the present invention, a matrix is provided for each exposure step of an area of the shaped body to be constructed, each element of the matrix being assigned an exposure element (for example a micromirror). FIG. 2 represents an array of 6×6 micromirrors, to which a 6×6 matrix would be assigned. Each element of the matrix contains a time-dependent function which specifies the time profile of the exposure intensity for this exposure element. In principle, this intensity profile may be specified individually for each exposure element.

It is, however, also possible to define subregions of the exposure region and to combine the exposure elements respectively assigned to a subregion in a common intensity time profile. According to one embodiment of the invention, continuous areas to be exposed are identified in the exposure region of an exposure step. Here, continuous areas are intended in particular to mean simply connected areas in the topological sense, i.e. each closed curve in the simply connected area encloses only regions which belong to the continuous area. Such a continuous area to be exposed is composed at least of a core region and an edge region. In the example shown in FIG. 3, a continuous area to be exposed is shown on the left, here in the form of a circular area. This continuous area in the example of FIG. 3 is composed of a core region, a central region around the core region and an edge region, which are represented on the right in FIG. 3.

FIG. 4 schematically shows the intensity profiles which are provided for the exposure elements assigned to the core region, the central region and the edge region. In this example, the intensity profile for the exposure elements assigned to the core region initially has a rising profile up to a maximum value and subsequently a phase with constant exposure intensity. In this case the exposure elements assigned to the core region have a common intensity profile, namely a rise from zero to a maximum value, subsequently a phase with constant intensity and eventually a drop to intensity zero. This common intensity profile of the exposure elements assigned to the core region is realized by controlling the light source with a corresponding intensity profile. After the end of the exposure of the core region, the exposure elements assigned to the central region are started with a slowly increasing intensity profile, which in turn leads up to a maximum intensity, subsequently remains at the maximum intensity for a predetermined phase and then decreases to zero. When the maximum intensity for the exposure elements of the central region is reached, the exposure elements assigned to the edge region are already started with maximum intensity and continue to remain at maximum intensity after the end of the exposure for the central region for about the same time. Also during the exposure of the central region and the edge region there are common variation components of the intensity profile, for example the rise at the beginning of the exposure of the central region. This common intensity variation, which has to be performed by all exposure elements to be activated, is realized by controlling the light source with a intensity profile corresponding to this variation. In this manner it is possible to set the light source time-dependently to the minimally required intensity such that the dosis integrated over the exposure step is minimal. In this manner also the irradiated dose of the dark field over each exposure step is minimal. This can be clarified in connection with FIG. 9 in which the intensity of the dark field is shown as a function of the intensity of the light source. As can be seen, the intensity of the dark field increases with increasing intensity of the light source. By utilizing the light source according to the invention to perform common intensity variations of the exposure elements over an exposure step, the integrated dosis in the dark field is reduced since the light source is operated in a time-dependent manner with lowest possible intensities, which compared to the situation with a constant intensity of the light source at the maximum level required in the exposure step results in a reduction of the integrated dosis in the dark field.

By the exposure sequence controlled as a function of time, the polymerization progresses from the inside outward in the region to be exposed. This makes it possible for shrinkages possibly occurring during the polymerization of an inner-lying region still to be compensated for by liquid photopolymerizable material flowing inward from a region lying further out, in which polymerization has not yet started because of the lack of exposure.

It can furthermore be seen in FIG. 4 that a shorter exposure duration is provided overall for the edge region than for the core region and the central region. The reason for this is that, in connection with the present invention, it has been found that with an increasing exposure duration, more light is also scattered into regions outside the actual exposure contour, i.e. the polymerized layer grows beyond the outer edge actually intended, which entails poor position resolution in the form of a poor definition of the edge of the cured layer. For this reason, an exposure which is as short as possible is carried out with maximum intensity for the edge region, so that the polymerization of the edge region is optimized in terms of a good position resolution.

As will be discussed in more detail below, the longer exposure durations shown in FIG. 4 for the core region and the central region, with a slow rise to the maximum exposure intensity, are optimized with a view to generating the least possible internal stresses in the polymerized material.

FIG. 5 shows an alternative time sequence control of the exposures of the core region, the central region and the edge region. It initially begins in step 1 and step 3 with slow exposure of the core region. In steps 5-7, the core region is exposed with a higher intensity than in steps 1-3. In step 5, moreover, first exposure of the central region begins, which is further exposed in step 7. In steps 9-11, the exposures for the central region then take place in quicker succession than in steps 5-8. In parallel with this, the edge region is exposed in steps 9-11. In contrast to the time sequence of the exposures of the core region, central region and edge region as shown in FIG. 4, the exposures in FIG. 5 partially overlap in the regions, i.e. the exposure of the central region already begins in step 5 at a time when the exposure of the core region has not yet been fully completed, the latter only ending in step 7. Likewise, the end of the exposure of the central region in steps 9-11 takes place in parallel with the exposure of the edge region. Overall, however, the exposure duration for the edge region is again shorter than those for the core region and the central region, in order to increase the accuracy of the edge definition.

Factors influencing the position accuracy of the polymerized areas generated by the exposure were investigated in the following way. In each case, a single layer having a thickness of about 60 μm was polymerized, the layer containing a regular arrangement of square "holes" with dimensions of 200 μm×200 μm. In other words, so to speak, a lattice comprising a regular arrangement of lattice apertures consisting of squares having side lengths of 200 μm was formed. The lattice layers formed under various conditions were subsequently examined using an optical microscope and thereby analyzed in respect of how much the lattice apertures (in the ideal case 200 μm×200 μm) had been altered by inaccurate edge definition (poor position resolution), i.e. in respect of how much the edges of the polymerized regions delimited by the lattice apertures had grown into the lattice apertures. The degree of ingrowth was measured as an oversize, which indicates the percentage by which the edges growing into the lattice aperture owing to poor edge definition reduce the area of the lattice aperture. An oversize of 0% means an ideal position definition, i.e. the lattice aperture corresponds exactly to the predetermined geometry of 200 μm×200 μm, an oversize of 50% means that the lattice aperture area is reduced to half because of edges growing in, and the extreme case of a 100% oversize would mean that the position resolution is so poor that the lattice aperture has entirely vanished.

Lattice layers with pulse sequences having a fixed frequency (100 Hz) and variable pulse duration were then studied. The results are presented in FIG. 6, where the oversize is shown as a function of the pulse duration for two intensities. The pulse duration was in this case varied from 0.001 s to 0.01 s, exposure with the maximum pulse duration of 0.01 s at a frequency of 100 Hz meaning continuous exposure. It can be seen that the oversize decreases with shorter pulse durations, i.e. the position resolution is optimal for pulse durations which are as short as possible. In principle it is also possible to generate the pulses by rapidly switching the light source on and off which, compared to a light source in continuous operation, results in a reduction of the average or integrated dosis in the dark field.

Correspondingly, according to the present invention, in the case of exposure with pulse sequences it is preferable to carry out the exposure in the edge region with pulse lengths of shorter duration than in the core region or a central region, so as to achieve a high accuracy in the edge region where a high position resolution is required for the definition of the edge, while operation can be carried out with longer pulse lengths in the core region and in the central region since the resolution is not important there.

The dependency of the position resolution, in the case of exposure with pulse sequences having a fixed pulse duration, on the pulse frequency was furthermore studied. FIG. 7 represents the position resolution in the form of the oversize in percent as a function of the pulse frequency for two fixed pulse durations, namely 0.1 s and 0.01 s. It can be seen therein that the position resolution improves toward lower frequencies (smaller oversize). Comparison of the results for the two pulse durations confirms the result of FIG. 6, according to which short pulse durations give a better position resolution.

According to the present invention, in the case of exposure with pulse sequences, it is therefore preferable to carry out the exposure in the edge region with pulse durations which are as short as possible, or in any event with a shorter pulse duration than for the exposures in a central region or in the core region.

FIG. 7 shows very clearly the extent to which the position resolution can be improved by reducing the frequency with a fixed pulse length. For example, the position resolution for a pulse sequence having a pulse duration of 0.01 s at the frequency 50 Hz corresponds to an oversize of 50%, i.e. the edges of the lattice apertures, which should actually be 200 μm×200 μm, are defined so poorly that the lattice apertures have been half closed. With the same pulse duration, by changing to a lower frequency of 5 Hz, the position resolution can be improved so greatly that the oversize is then only about 5%.

Further tests were carried out in respect of how the internal stresses in the constructed shaped body, and therefore the cracks in the sintered body after debindering, can be reduced. Different lengths of exposure times were used. FIG. 6 shows three examples of an intensity profile, which have initially a rise following an e function to 100% and then a shorter subsequent phase with constant intensity. The intensity profiles represented in FIG. 8 comprise e functions having three different time constants. Comparison of the final sintered bodies showed that there are commensurately fewer cracks when the time constant of the e function at the start of the exposure is greater.

This result was also confirmed when starting the exposure at a relatively low constant level, followed by a phase with maximum intensity. Here, it is found that longer exposure to begin with at a relatively low constant level leads to a reduction of cracks in the final product compared to the phase of exposure with the maximum level.

The invention claimed is:

1. A method for the construction of a shaped body from photopolymerizable material by using lithography-based generative production (rapid prototyping), in which a layer of liquid photopolymerizable material is defined on a production platform, the layer is polymerized in an exposure region having a predetermined contour by an exposure unit in an exposure step, a further layer of photopolymerizable material is defined, the layer defined last is polymerized in a further exposure step in an exposure region having a predetermined contour for the layer defined last, and the latter two steps are repeated until a shaped body having a predetermined shape has been formed by the sequence of cured layers with contours predetermined layer by layer, each exposure in an exposure region having a predetermined contour being carried out by controlled activation of individual exposure elements in a two-dimensional array of exposure elements, each exposure element being assigned an image element and the exposed image elements together defining the exposure region, wherein the exposure of the exposure region is carried out by a common light source and by a two-dimensional light intensity modulator which is illuminated by the light source and which has a grid of individually controllable intensity modulators, in such a way that each illuminated intensity modulator forms an exposure element that exposes an image element in the exposure region, wherein a two-dimensional matrix is compiled for each exposure step of a layer, each element of the matrix being assigned to an exposure element in the array of exposure elements and control instructions for this exposure element being obtained in the form of a time-dependent function which individually establishes the intensity profile of the radiation of the exposure element over the exposure step, characterized in that, component of the intensity variation common to all time-dependent functions of the intensity profiles of all exposure elements to be activated is carried out as a general intensity variation in an exposure step by controlling the intensity of the light source in accordance with the general intensity variation.

2. The method as claimed in claim 1, wherein the intensity of the light source is controlled over the course of the exposure step such that the intensity of the light source is set at each point in time in dependence of the time-dependent functions to the lowest possible value which is just sufficient to provide the image elements which currently have to be exposed with highest intensity only just with the intensity needed for them.

3. The method as claimed in claim 1, wherein during an exposure step, one or more continuous areas to be exposed in the current exposure region and the exposure elements assigned to them, which are to be activated, are identified and each continuous area is composed of a core region and an edge region, the time-dependent functions of the intensity profiles of the exposure elements being selected in such a way that they are started earlier in the core region than the exposure elements in the edge region.

4. The method as claimed in claim 1, wherein during an exposure step, one or more continuous areas to be exposed in the current exposure region and the exposure elements assigned to them, which are to be activated, are identified and each continuous area is composed of a core region, one or more central regions with an increasing distance from the core region, and an edge region, and wherein the time-dependent functions of the intensity profiles of the exposure elements are selected in such a way that they are started first in the core region, then are started in the central zone or zones successively in the order of their distance from the core region, and finally the exposure elements in the edge region are started.

5. The method as claimed in claim 3, wherein the time-dependent functions of the intensity profiles of the exposure elements are selected in such a way that the exposure elements of a central region or of the edge region are started only when the exposure elements of the preceding region lying further inward have delivered at least 50% of their integrated intensity for the current exposure step.

6. The method as claimed in claim 5, wherein the time-dependent functions of the intensity profiles of the exposure elements are selected in such a way that the exposure elements of a central region or of the edge region are started only when the exposure elements of the preceding region lying further inward have fully delivered their integrated intensity for the current exposure step.

7. The method as claimed in claim 3, wherein the time-dependent functions of the intensity profiles of the exposure elements are selected in such a way that, during an exposure step, the integrated exposure duration in the edge region is shorter than in the regions lying further inward.

8. The method as claimed in claim 3, wherein the time-dependent functions of the intensity profiles of the exposure elements are defined by pulse sequences having predetermined pulse lengths and periods, and wherein the pulse lengths for the pulse sequences for exposure elements for the edge region are selected to be shorter than those for exposure elements for regions lying further inward.

9. The method as claimed in claim 3, wherein the time-dependent functions of the intensity profiles of the exposure elements are defined by pulse sequences having predetermined pulse lengths and periods, and wherein the periods for the pulse sequences for exposure elements for the edge region are selected to be longer than those for exposure elements for regions lying further inward.

10. The method as claimed in claim 1, wherein the time-dependent functions of the intensity profiles of the exposure elements are selected in such a way that, during an exposure step, they have a first exposure phase with a low exposure intensity and subsequently a phase having a high intensity at a maximum value for a predetermined period, the time-dependent functions being established in such a way that the first exposure phase with a lower intensity is at least three times as long as the predetermined period at the maximum value.

11. The method as claimed in claim 10, wherein the time-dependent functions of the intensity profiles in the first exposure phase are defined by functions of the form $I_0 \cdot e^{t/\tau}$, where $I_0$ is a constant and $\tau$ is a predetermined time constant.

12. The method as claimed in claim 1, wherein, when two or more areas lying next to one another but separated by intermediate spaces are to be exposed in the exposure region, the exposure elements of directly neighboring areas are controlled as a function of time in such a way that the exposure of directly neighboring areas takes place with a time offset with respect to one another.

* * * * *